INVENTORS
S.H. GORDON
W.F. YOUNG
BY Blair+Kilcoyne
ATTORNEYS

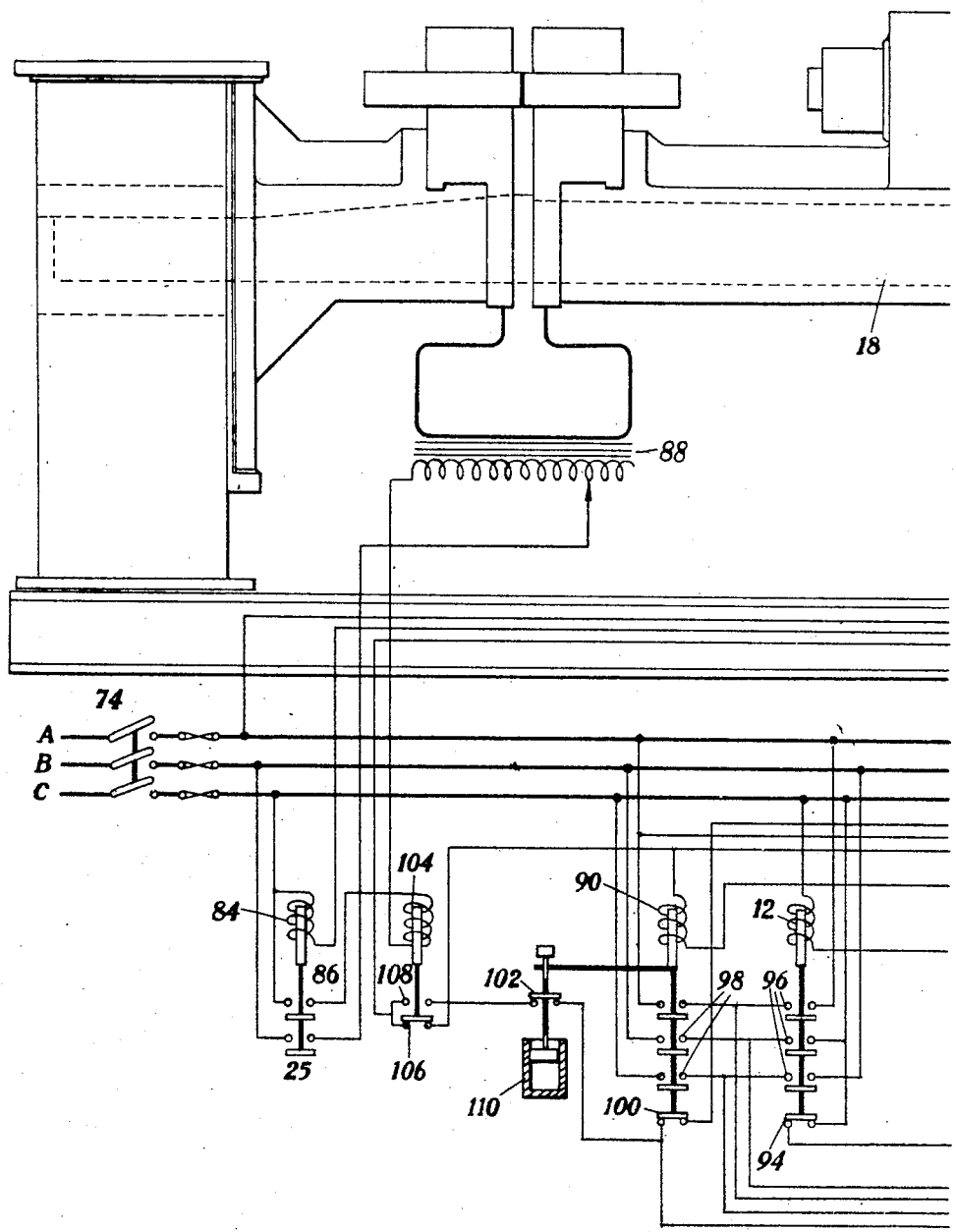

Oct. 6, 1942.  S. H. GORDON ET AL  2,298,051
ELECTRIC FLASH WELDING MACHINE
Filed Jan. 18, 1941  5 Sheets-Sheet 5

INVENTOR
S. H. GORDON
W. F. YOUNG
BY Blair + Kilcoyne
ATTORNEYS

Patented Oct. 6, 1942

2,298,051

UNITED STATES PATENT OFFICE 2,298,051

ELECTRIC FLASH WELDING MACHINE

Samuel Hunter Gordon and William Forbes Young, Inverness, Scotland

Application January 18, 1941, Serial No. 375,074
In Great Britain January 11, 1940

6 Claims. (Cl. 60—54.5)

This invention relates to automatic electric flash-welding machines of the kind described in Patent No. 2,187,452. In the specification of that patent means are described whereby a reciprocating motion of approach of one of the workpieces to be welded to the other, for the purpose of preheating the workpieces, is maintained by fluctuations of fluid pressure in a fluid-operated feed mechanism, these fluctuations being brought about by the meeting together of the cold unsoftened workpieces. In the embodiment of that invention described in the prior specification the regulation of the speed of the feeding movement was effected by means of an adjustable creep valve, whereby the rate at which liquid flowed into or out of a hydraulic cylinder could be adjusted. In some circumstances this mode of regulating the feed movement has the disadvantage that with a given adjustment the speed will vary with the temperature of the liquid. It is the object of the present invention to provide an improved feed mechanism which among other advantages would be free from liability to undesired variation due to changes of temperature.

According to this invention the moving head of the welding machine is moved in both directions by hydraulic means supplied with liquid by a mechanically driven reversible pump, the reversing means being under the control of a device sensitive to the pressure of the liquid which causes the forward movement of the moving head.

It will be appreciated that when the cold workpieces meet they will oppose resistance to the feed movement, thereby causing a rise of pressure in the hydraulic driving means and when this pressure exceeds a predetermined amount the movement of the pump is reversed automatically thereby separating the workpieces. The pressure thereupon falls, the pressure-sensitive device is no longer operative and the pump reverts to its original direction of operation to cause the forward feed movement to be resumed. These successive reversals of movement will continue until the workpieces attain such a temperature that flashing occurs, whereupon no further mechanical resistance to the feed movement occurs, the pressure of the liquid does not rise beyond the predetermined limit and therefore the forward feed movement continues uninterruptedly.

Owing to the fact that the pump is mechanically driven and that restricted orifices are not employed, the speed of the feed movement is not dependent upon the temperature of the liquid.

Referring to the accompanying drawings.

Figure 1:
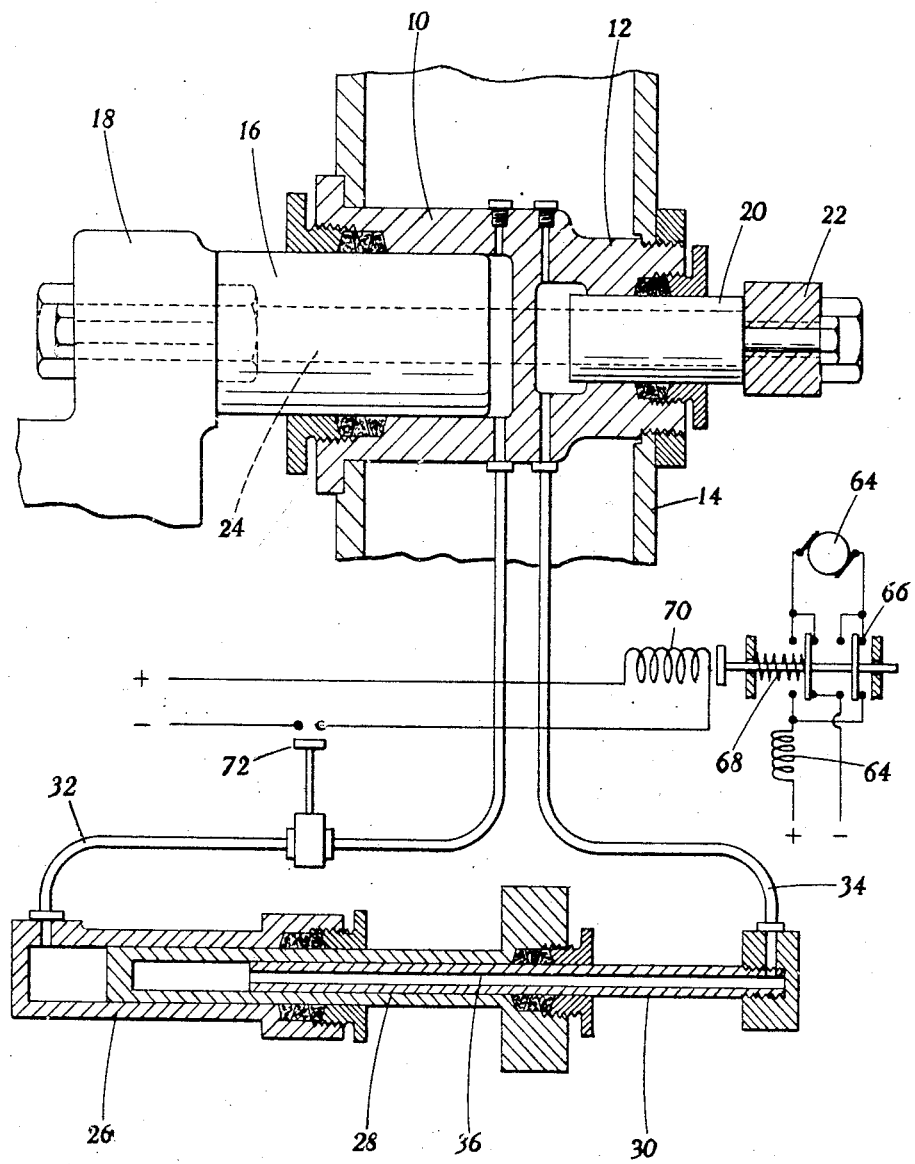
Figure 1 is a diagrammatic side elevation partly in section of mechanism according to this invention.

Referring to Figure 1, the feed mechanism consists of two hydraulic cylinders 10, 12 placed back to back and secured to a fixed part 14 of the welding machine. The cylinder 10 is larger in diameter than the cylinder 12 and a ram 16 in the cylinder 10 is connected directly to the moving head 18, so that outward movement of the ram 16 causes the forward feed movement. A ram 20 in the cylinder 12 is attached to a crosshead 22 connected by tie-rods 24 to the moving head 18, the outward movement of the ram 20 thereby causing the return motion of the moving head.

Figure 2:
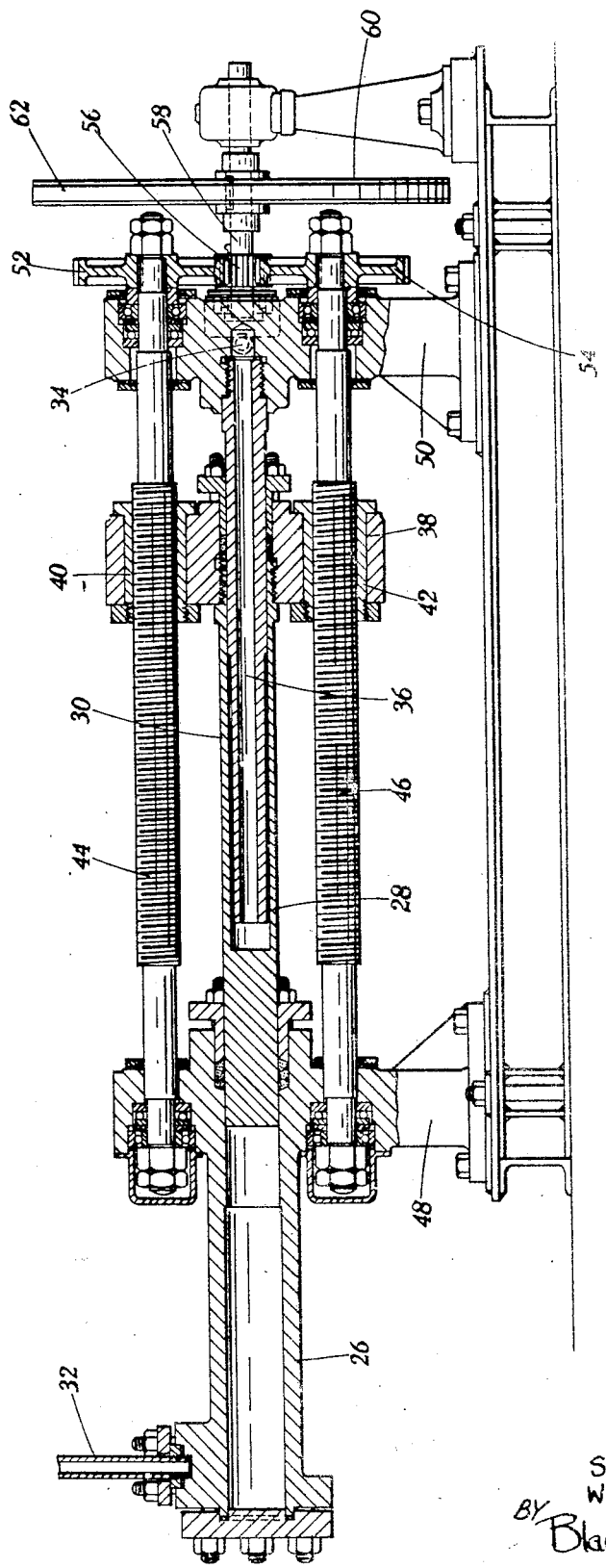
Figure 2 is a side elevation partly in section of the pump mechanism.
Figure 3:
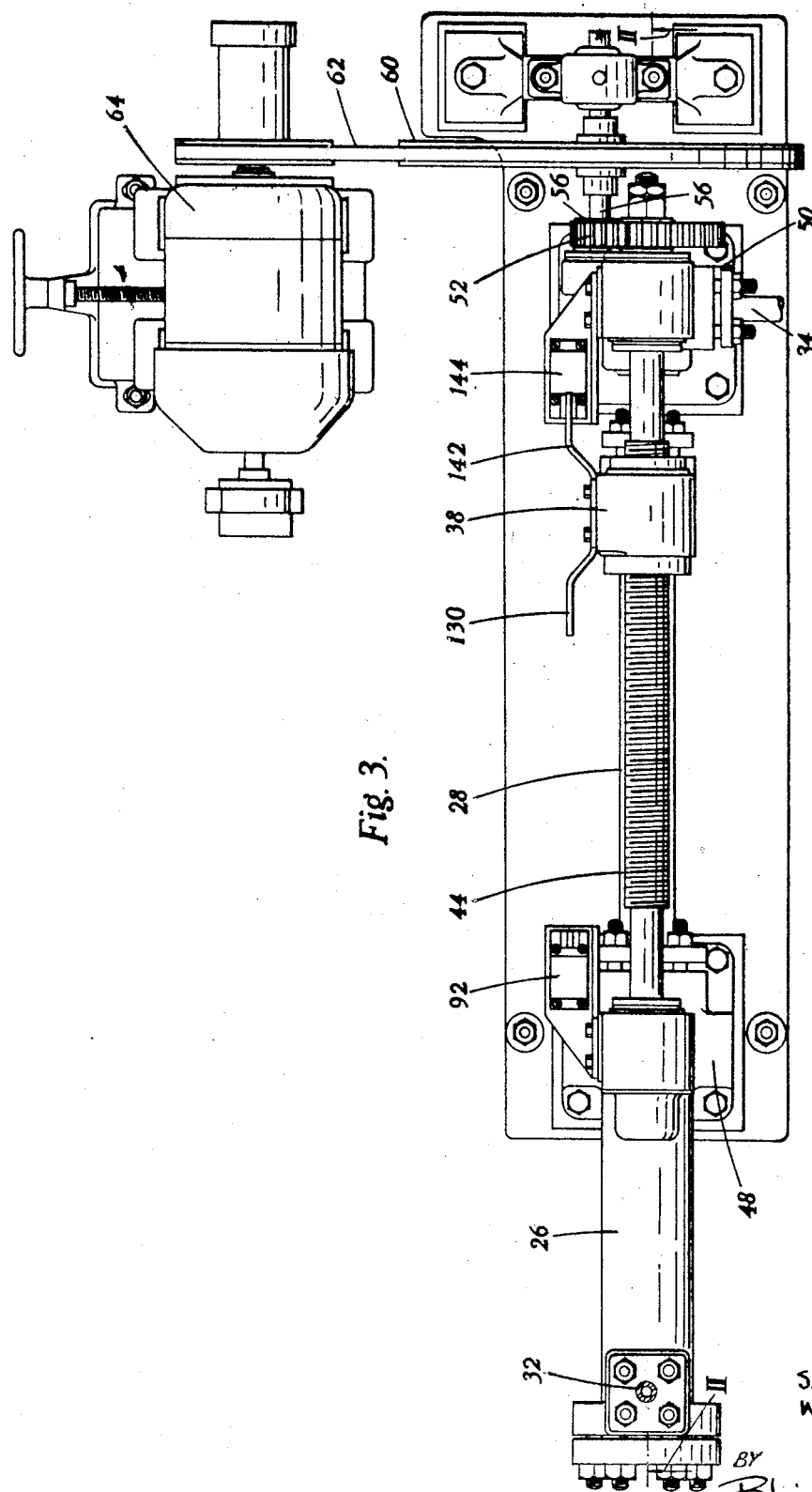
Figure 3 is a plan of Figure 2.

The pump consists of a double ram comprising a fixed cylinder 26, a ram 28 moving in this cylinder and bored to receive a fixed ram 30. The cylinder 26 is connected by a pipe 32 to the feed cylinder 10 and the bore in the moving ram 28 is connected by a pipe 34 to the return cylinder 12 through a passage 36 extending from end to end of the fixed ram 30. The ratio of the diameters of the pump cylinder 26 and of the bore in the moving ram 28 is equal to the ratio of the diameters of the cylinders 10, 12. Thus, if the moving ram 28 is moved to the left liquid will be forced into the cylinder 10 thereby driving the moving head 18 forward, while liquid will be driven out of the cylinder 12 into the bore in the moving ram 28. If this ram 28 is moved to the right, liquid will be forced into the cylinder 12, while the liquid displaced from the cylinder 10 will pass into the pump cylinder 26. The diameter of the pump cylinder is only a fraction of that of the forward feed cylinder 10 and therefore the travel of the moving head 18 will be much smaller than the travel of the pump ram 28. As shown in Figures 2 and 3, the ram 28 carries a crosshead 38 in which are fixed two nuts 40, 42 threaded onto similarly threaded screw spindles 44, 46. These spindles are mounted in bearings in brackets 48, 50 which support the cylinder 26 and the fixed ram 30. The spindles carry equal gearwheels 52, 54 meshing with a pinion 56 fixed to a shaft 58 which carries a pulley 60 driven by a belt 62 from an electric motor 64. In order to illustrate the principle of operation of the pressure-sensitive means, a simplified arrangement will first be described. In this arrangement the supply of current to the motor is taken through a reversing switch 66 which is biased into one position by a spring 68 and is moved into the other position by an electromagnet 70. The electromagnet is energised by the closing of a pressure-operated switch 72 in the pipe 32 leading from the pump cylinder 26 to the forward feed cylinder 10, the arrangement being such that when the pressure in the cylinders 10, 26 rises above a predetermined limit the switch 72 will be closed and the electromagnet energised thereby reversing the direction of rotation of the motor 64.

When the switch 72 opens, the switch 66 is returned to its original position by the spring 68 and the arrangement is such that when the switch is in this position the moving ram 28 is driven towards the left, thereby causing the moving head to be fed forward. At the beginning of the welding operation this forward movement continues until the cold workpieces come together. In general, flashing will not occur immediately and the feed movement will be opposed to such an extent that the rise of liquid pressure in the cylinder 10 causes the switch 72 to be closed, thereby reversing the motor 64 and driving the ram 28 in the reverse direction, that is to say, towards the right. This will cause the moving head to move to the right thereby separating the workpieces. As soon as the workpieces separate, the pressure in the cylinder 10 falls, the switch 72 opens and the spring 68 returns the reversing switch to its original position, thereby causing the motor to rotate in its original direction with the result that forward feed will be resumed. This sequence of operations continues until the flashing temperature is reached, whereupon the forward movement will continue uninterruptedly because the mechanical resistance to the forward feed never reaches the limit at which the switch 72 is closed. After a predetermined travel of the moving head a so-called butting mechanism comes into operation automatically to complete the weld and to cut off the current from the welding transformer.

Figure 4A:
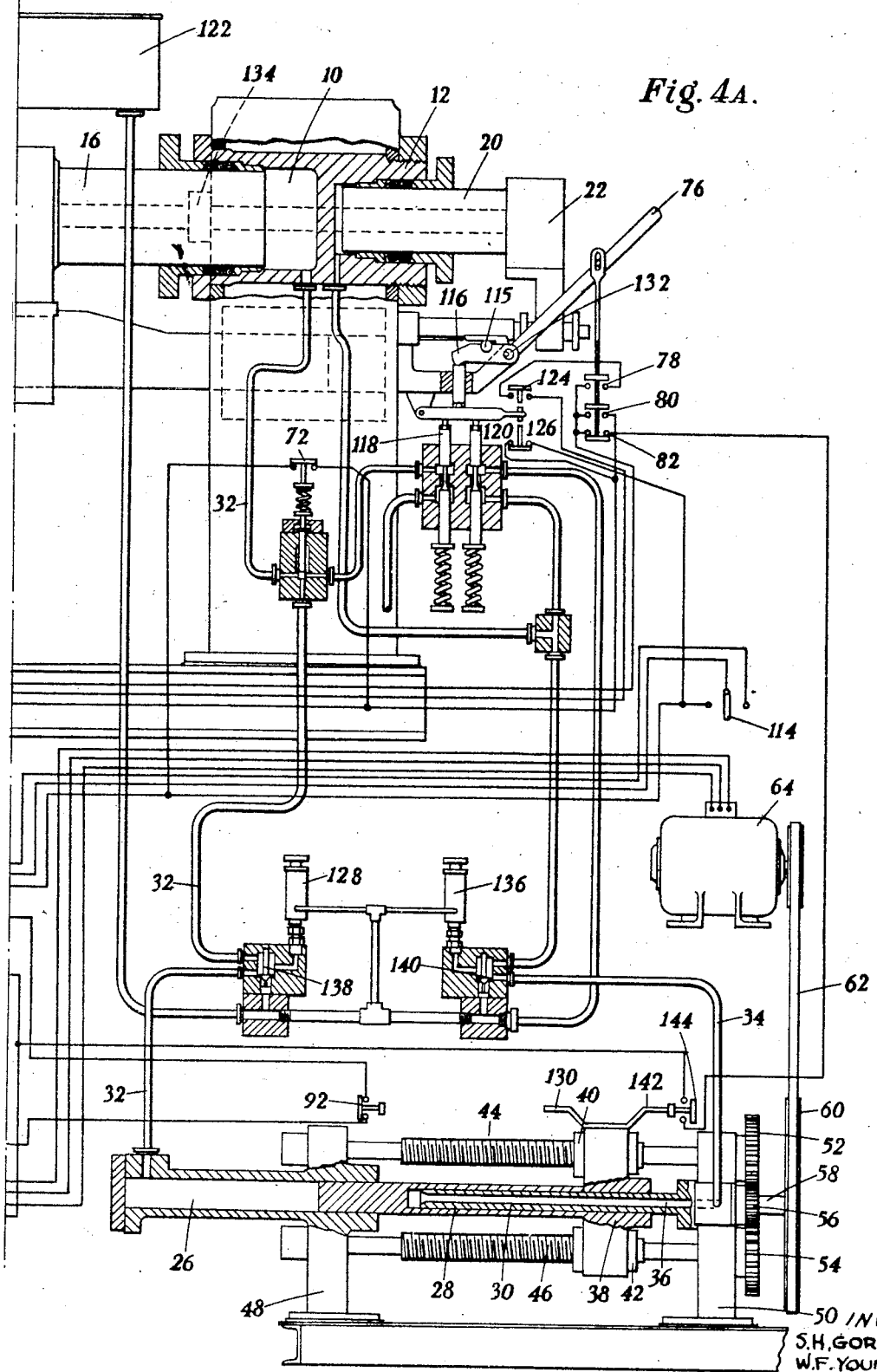
Figure 4 is a circuit diagram.

Figure 4 is a circuit diagram of the preferred arrangement whereby the machine is operated and controlled. In this arrangement the pressure-operated switch 72 is normally closed and is opened when the pressure rises beyond a predetermined limit. Provision is made for a delay, the extent of which can be varied, before the motor 64 is reversed, so that the workpieces remain in contact for an appreciable time before they are separated so that their meeting faces become heated. The resumption of forward feed comes about as a result of the drop in welding current due to the separation of the workpieces.

Current is supplied from 3-phase mains A, B, C, through a main switch 74. The operating handle 76 controls three switches 78, 80, 82. To start the machine the handle is depressed to close switches 78, 80 and open switch 82. The closing of switch 78 energises the main contactor coil 84, the circuit being from A through points $a$, $b$, $c$, $d$, 78, a switch 126 (normally closed) which will be described later, winding 84, C. The energisation of 84 closes switches 86 and 28, thus supplying current to the primary winding of the welding transformer 88.

The closing of switch 80 completes a circuit through the forward feed contactor coil 90. This circuit, which will be referred to as the "forward feed circuit," runs from A through $a$, $b$, $c$, 80, $j$, switch 106 which is closed at this time, $e$, 90, switches 92, 94 both of which are closed, $g$, $h$, C. The switch 92 will be described later; it is a forward limit switch and is opened automatically at the end of the welding operation. The switch 94 is an interlock switch on the reverse motor contactor 96 and is opened when this contactor is closed.

The closing of the forward contactor 98 supplies current to the motor 64 which rotates in the forward direction, moving the ram 28 to the left thereby causing the moving head 18 to advance. At the same time the interlock switch 100 is closed.

When the work pieces make contact, current flows in the primary winding of the transformer 88, and a relay 104 in the primary circuit will be energised and will open one switch 106 and close another switch 108. The opening of 106 breaks the forward feed circuit through the winding 90, but this winding remains energised by a circuit from A by way of $a$, $b$, $c$, 80, $j$, pressure switch 72, $k$, 101, $j$, $e$, 90, 92, 94, $h$, C. This circuit will be referred to as the "pressure switch circuit." This circuit, however, is almost immediately interrupted by the opening of the pressure switch 72 consequent on the mechanical resistance offered by the cold work pieces. Thus, the winding 90 is de-energised, the forward contactor 98 opens, the switch 101 is opened and the switch 100 is closed. When 90 is de-energised and switch 100 closes the reverse motor contactor coil 112 will be energised momentarily, the circuit being from A by way of $a$, $b$, $c$, 114F, 100, $l$, $m$, 112, C. The motor will thus reverse momentarily as a result of the closing of 98 and will then stop. The two switches 114F and 114B are operated automatically by the motor, 114F being closed while the motor is running forward and 114B being closed while the motor is running in reverse.

When the forward contactor coil 90 was energised the switch 102 was opened. When 90 is de-energised, however, switch 102 does not close again immediately, being prevented from doing so by a dash-pot 110. So long as 102 is open, the reverse contactor coil 112 cannot be energised. Therefore, after the motor has stopped, the work pieces remain in contact, being heated by the passage of current through them, for a time depending on the time of action of the dash-pot, which is made adjustable. During this heating period there is a possibility of leakage of pressure in the cylinder 10 which might cause the pressure switch 72 to close. The forward contactor coil 90, however, cannot be re-energised because at this time the switch 101 is open.

When the switch 102 finally closes, a circuit is established from A through $a$, $b$, $c$, 80, $j$, 108, 102, $l$, $m$, 112, C. The energisation of 112 closes the reverse contactor 96, the motor starts in reverse, the pressure switch 72 closes, if it has not closed already, the work pieces separate, winding 106 is de-energised, switch 108 opens and switch 106 closes.

The opening of switch 108 (consequent on drop of current in the transformer winding 88) breaks the last-mentioned circuit, the reverse contactor winding 112 is de-energised, the reverse contactor 96 opens, the interlock switch 94 closes and the forward feed circuit, previously referred to, is re-established energising 90, causing the motor to run forward until the work pieces come together again as previously described. This cycle of operations is repeated until the work pieces no longer oppose mechanical resistance at the time the pressure switch circuit is established. In these circumstances the pressure switch 72 remains closed and the pressure switch circuit is maintained, with the result that the motor continues to rotate forwards.

On the crosshead 22 is mounted an adjustable cam 115. At a predetermined point in the forward feed movement this cam will push downwards a pivoted lever 116 thereby opening a valve 118 which allows high pressure oil from an independent source to enter the forward feed cylinder 10 and thus drive the moving head 18 forward at an increased speed to butt the work pieces together and complete the weld. At the same time another valve 120 is opened to connect the return cylinder 12 to an oil reservoir 122 to allow the oil displaced by the rapid forward movement of the moving head to escape.

The downward movement of the lever 116 also opens the switch 126 previously referred to and closes another switch 124. The opening of 126 de-energises the winding 84, thereby opening switches 85 and 86. The welding current is thereby cut off from the primary transformer winding 88 and the winding 104 is de-energised, closing switch 106 and opening switch 108.

When the switch 124 is closed there is a circuit from A through a, b, c, 80, 124, k, 101, f, e, 90, 92, 94, h, C. The switch 124 is, therefore a shunt across the pressure switch 72 and keeps the motor running forwards in spite of 72 being opened by the high pressure supplied to the cylinder 10 through the valve 118. The oil displaced from the cylinder 26 during this movement escapes through a relief valve 128 into the reservoir 122. The cross-head 38 carries a projection 130 which presently opens the forward limit switch 92 previously referred to, which will de-energise the coil 90 and cause the forward motor contactor 98 to open. This establishes a circuit A, a, b, c, 114F, 100, l, m, 112, C. This causes the motor to reverse momentarily and then stop.

The weld is now complete and the welded work pieces are removed from the machine. The operating handle 76 is moved back to its original position and the lever 116 is lifted. This comes about owing to the fact that its pivots are eccentrically mounted on the spindle 132 of the operating handle 76. Thus, the raising of the handle 76 depresses the right hand end of the lever 116 thereby causing its operative left hand end to be raised by a spring, not shown. The valves 118 and 120 are thereby closed, the switches 78, 80, 124 are opened, and the switches 82, 126 are closed. The closing of 82 energises the reverse contactor coil 112, the circuit being from A through a, b, c, 82, 144, m, 112, C. The motor runs in reverse, the pump ram 28 being moved to the right. A limit stop 134 is provided which arrests the rams 16, 20 at a predetermined position. When this takes place, the pump ram 28 is still moving to the right, displacing oil past a second relief valve 136 into the oil reservoir 122. At the same time the pump cylinder 26 receives oil from the reservoir through a non-return valve 138. A second non-return valve 140 serves in the same way for the bore in the pump ram 28 and the two valves 138 and 140 enable the oil circuit to be filled in the first place and maintain it full against any small leakages that might take place.

A second projection 142 on the crosshead 38 ultimately opens a back limit switch 144 which de-energises the reverse contactor coil 112 and closes the interlock switch 94. The switch 80 being open, 90 cannot be energised through the forward feed circuit, but the motor-operated contacts 114B are now closed and there is a circuit from A through a, b, c, 114B, f, e, 90, 92, 94, h, C. The forward contactor 98 closes, the motor starts in the forward direction, 114B opens immediately thereby de-energising the coil 90, which cannot be re-energised through the forward feed circuit because 80 is open. This brings the operation to an end and no current can flow in any of the circuits until the switch 80 is closed by the handle 76 to initiate the next welding operation.

We claim:

1. A hydraulic system comprising in combination hydraulic ram means operable in a forward direction and in the reverse direction, a mechanically driven reversible pump for supplying liquid under pressure to said hydraulic means, reversing means for said pump and a device sensitive to variation in the liquid pressure causing the forward movement for actuating the reversing means to cause reverse movement as a consequence of rise of liquid pressure above a predetermined limit and for again actuating said reversing means to cause forward movement as a consequence of fall of liquid pressure below said limit.

2. A hydraulic system according to claim 1, including an electric motor to drive said pump and wherein said reversing means includes a reversing switch through which current is supplied to said motor and which operates to reverse the direction of rotation of the motor in response to the rise or fall in pressure of the liquid as aforesaid.

3. A hydraulic system according to claim 1, including an electric motor to drive said pump and wherein said reversing mechanism includes a reversing switch, a pressure actuated switch, and an electromagnet which is energized upon closing of the pressure switch to operate the reversing switch to a position in which it operates to reverse the direction of rotation of the motor in response to the rise in pressure of the liquid aforesaid and to return the reversing switch to its normal position in response to fall in pressure of the liquid.

4. A hydraulic system comprising in combination hydraulic ram means operable in a forward direction and in the reverse direction, said means consisting of two cylinders placed back to back, one for forward movement and the other for reverse movement, a cross head and tie rods connecting the rams, a mechanically driven reversible pump supplying liquid under pressure to said cylinders, reversing means for said pump and a device sensitive to variation in the liquid pressure causing the forward movement for actuating the reversing means to cause reverse movement as a consequence of rise of liquid pressure above a predetermined limit and for again actuating said reversing means to cause forward movement as a consequence of fall of liquid pressure below said limit.

5. A hydraulic system according to claim 4, wherein said pump consists of a fixed cylinder, a mechanically driven ram moved within the cylinder and bored to constitute a second cylinder, and a fixed ram within the second cylinder, the first pump cylinder being connected to the forward cylinder and the second pump cylinder being connected to the reverse cylinder of the hydraulic ram means.

6. A hydraulic system according to claim 4, wherein the pump consists of a fixed cylinder, a mechanically driven ram moved within the cylinder and bored to constitute a second cylinder, and a fixed ram within the second cylinder, the first pump cylinder being connected to the forward cylinder and the second pump cylinder being connected to the reverse cylinder of the hydraulic ram means, and wherein the movable ram is driven by two nuts, carried one on either side thereof, and engaging two screw spindles positively geared together and mechanically rotated.

SAMUEL HUNTER GORDON.
WILLIAM FORBES YOUNG.